United States Patent [19]

Alloin et al.

[11] Patent Number: 4,647,712

[45] Date of Patent: Mar. 3, 1987

[54] ELECTRIC CABLE FOR TRANSPORTATION VERY HIGH CURRENT AT LOW VOLTAGE, AND METHODS OF MANUFACTURING SUCH A CABLE

[75] Inventors: Michel Alloin, Trevoux; Charles Flamand, Francheville, both of France

[73] Assignee: Les Cables de Lyon, Clichy, France

[21] Appl. No.: 700,201

[22] Filed: Feb. 11, 1985

[30] Foreign Application Priority Data

Feb. 10, 1984 [FR] France ............................. 84 02099
Nov. 15, 1984 [FR] France ............................. 84 17425

[51] Int. Cl.⁴ ............................................. H01B 7/34
[52] U.S. Cl. ............................. 174/15 WF; 174/24; 174/29
[58] Field of Search ............... 174/15 C, 15 WF, 24, 174/29

[56] References Cited

U.S. PATENT DOCUMENTS

| | | | |
|---|---|---|---|
| 2,381,003 | 8/1945 | Ryan | 174/29 |
| 2,939,902 | 6/1960 | Wreford | 174/15 WF |
| 3,143,593 | 4/1964 | Toto | 174/15 WF |
| 3,801,724 | 4/1974 | Goodman | 174/15 WF |
| 3,872,232 | 3/1975 | Goodman | 174/15 WF X |

FOREIGN PATENT DOCUMENTS

| | | | |
|---|---|---|---|
| 273087 | 2/1967 | Australia | 174/29 |
| 1099608 | 2/1961 | Fed. Rep. of Germany . | |
| 784036 | 10/1957 | United Kingdom . | |
| 2040546 | 5/1980 | United Kingdom | 174/15 WF |

Primary Examiner—Arthur T. Grimley
Assistant Examiner—Morris H. Nimmo
Attorney, Agent, or Firm—Sughrue, Mion, Zinn, Macpeak, and Seas

[57] ABSTRACT

An electric cable (1) for transporting very high current at low voltage, in particular a welding cable for use in robot welders, comprises at least one multi-strand conductor (2) and an outer sheath (4), cooling water circulates inside the cable, and the water grains access to the conductor strands to be cooled by virtue of the conductor being covered by a perforated envelope (3).

3 Claims, 8 Drawing Figures

4,647,712

ELECTRIC CABLE FOR TRANSPORTATION VERY HIGH CURRENT AT LOW VOLTAGE, AND METHODS OF MANUFACTURING SUCH A CABLE

The present invention relates to the subject matter of copending U.S. application Ser. No. 714,764 filed Mar. 22, 1985, entitled "A LIQUID-COOLED ELECTRIC CABLE" by the applicants herein and assigned to the same corporate assignee.

The present invention relates to an electric cable for transporting high current at low voltage, in particular a welding cable.

The invention also relates to first and second methods of manufacturing such a cable.

BACKGROUND OF THE INVENTION

Electric cables for conveying high current at low voltage, in particular welding cables, are generally constituted by one or more conductors each of which comprises a multitude of elementary strands covered by an outer sheath. So-called cooling channels exist between the conductor(s) and the sheath and provide for the circulation of water required to cool the cables.

However, as the cables are used, the elementary strands are abraded because of electrodynamic vibrations and because of mechanical forces applied thereto, thus causing the cooling channels to become obstructed. Some cables included polyester or polypropylene braids between the conductor(s) and the outer sheath, thereby increasing the risks of obstructing the cooling channels.

Preferred embodiments of the present invention considerably increase the lifetime of the cables by reducing breakages in the elementary strands by means of improved protection of the conductor(s) using a perforated envelope.

SUMMARY OF THE INVENTION

The present invention provides an electric cable for transporting very high current at low voltage, in particular a welding cable, comprising at least one multi-strand conductor and an outer sheath, water circulation being provided inside the cable, and the cable having the improvement whereby at least one multi-strand conductor is covered by a perforated envelope allowing the water to circulate.

Advantageously, the perforated envelope is constituted by two layers which are fixed to each other, with each layer being constituted by at least one strip.

In a first embodiment, one layer is constituted by at least one helical strip and the other layer is constituted by at least one longitudinal strip.

In another embodiment, both layers are constituted by helical strips.

The present invention also provides a first method of manufacturing such a cable, consisting in covering at least one multi-strand conductor with an outer sheath enabling water circulation, with the improvement wherein, prior to placing the sheath around the conductor(s), the or each conductor is separately inserted into the center of an extruder, and two layers of material which are fixed to each other are extruded onto the conductor, an inner one of the layers being extruded by means of a punch, and an outer one of the layers by means of a die.

Advantageously, one layer is made by means of a rotating punch or die, and a longitudinal layer is made by means of a fixed punch or die.

The present invention also provides a second manufacturing method consisting in covering at least one multi-strand conductor with an outer sheath enabling water circulation, the method including the improvement wherein, prior to the sheath being placed around the conductor(s), a first tape layer is wound helically around the conductor, the conductor is inserted in a device for impregnating or for hot gluing, and a second tape layer is placed thereon and fixed to the first layer.

Advantageously, the first layer is made by means of at least one spooler mounted on a rotary plate, and the second layer is made by means of at least one spooler and a die, which may be fixed or rotating.

BRIEF DESCRIPTION OF THE DRAWINGS

Two electric cables in accordance with the invention are described by way of example with reference to the accompanying drawings, together with first and second manufacturing devices for performing the first and second manufacturing methods respectively.

MORE DETAILED DESCRIPTION

Figure 1:
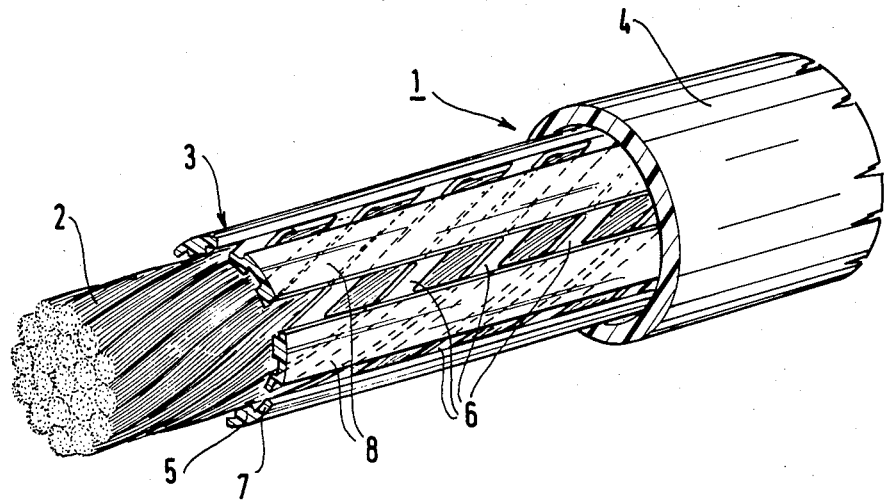
FIG. 1 shows a first electric cable in accordance with the invention including a single multi-strand conductor.

FIG. 1 shows a cable 1 comprising a single multi-strand conductor 2, a perforated envelope 3 and an outer sheath 4. The envelope 3 comprises two distinct layers which are nevertheless fixed to each other, comprising an inner layer 5 in contact with the conductor 2 and an outer layer 7 which may be in contact with the outer sheath 4.

The inner layer 5 is constituted by a plurality of helical strips 6 and the outer layer 7 is constituted by a plurality of longitudinal strips 8. The strips 6 are non-contiguous, as are the strips 8, thereby constituting a perforated envelope 3 enabling water to circulate along the cable 1. The water is then in contact with the conductor 2.

Figure 2:
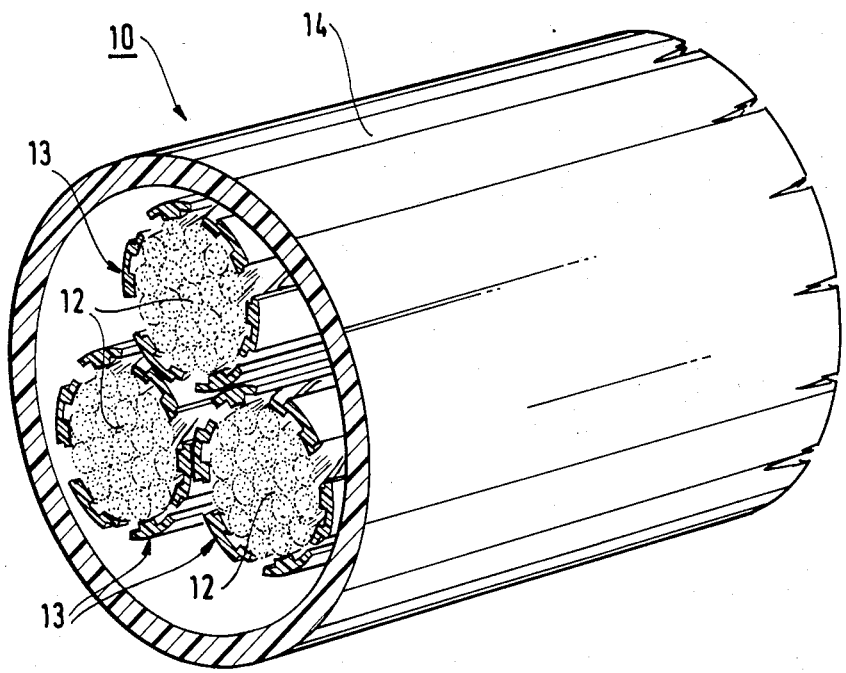
FIG. 2 shows a second electric cable in accordance with the invention comprising three multi-strand conductors.

In FIG. 2, a cable 10 includes three multi-strand conductors 12, each conductor being covered by a perforated envelope 13 identical to the envelope 3 shown in FIG. 1. These three conductors provided with respective envelopes are places inside an outer sheath 14 which is watertight and which has water flowing therealong. The sheath could naturally have two multi-strand conductors, or four or more.

The envelope 3 or 13 provides very low voltage electrical isolation and mechanical protection of the elementary strands.

The insulating envelope may naturally include an outer layer 7 constituted by helical strips turning in the opposite direction to the helical strips of the inner layer 5, or else the inner layer 5 may be constituted by longitudinal strips while the outer layer 7 is constituted by helical strips.

Naturally, the number of strips in each layer is arbitrary.

Figure 3:
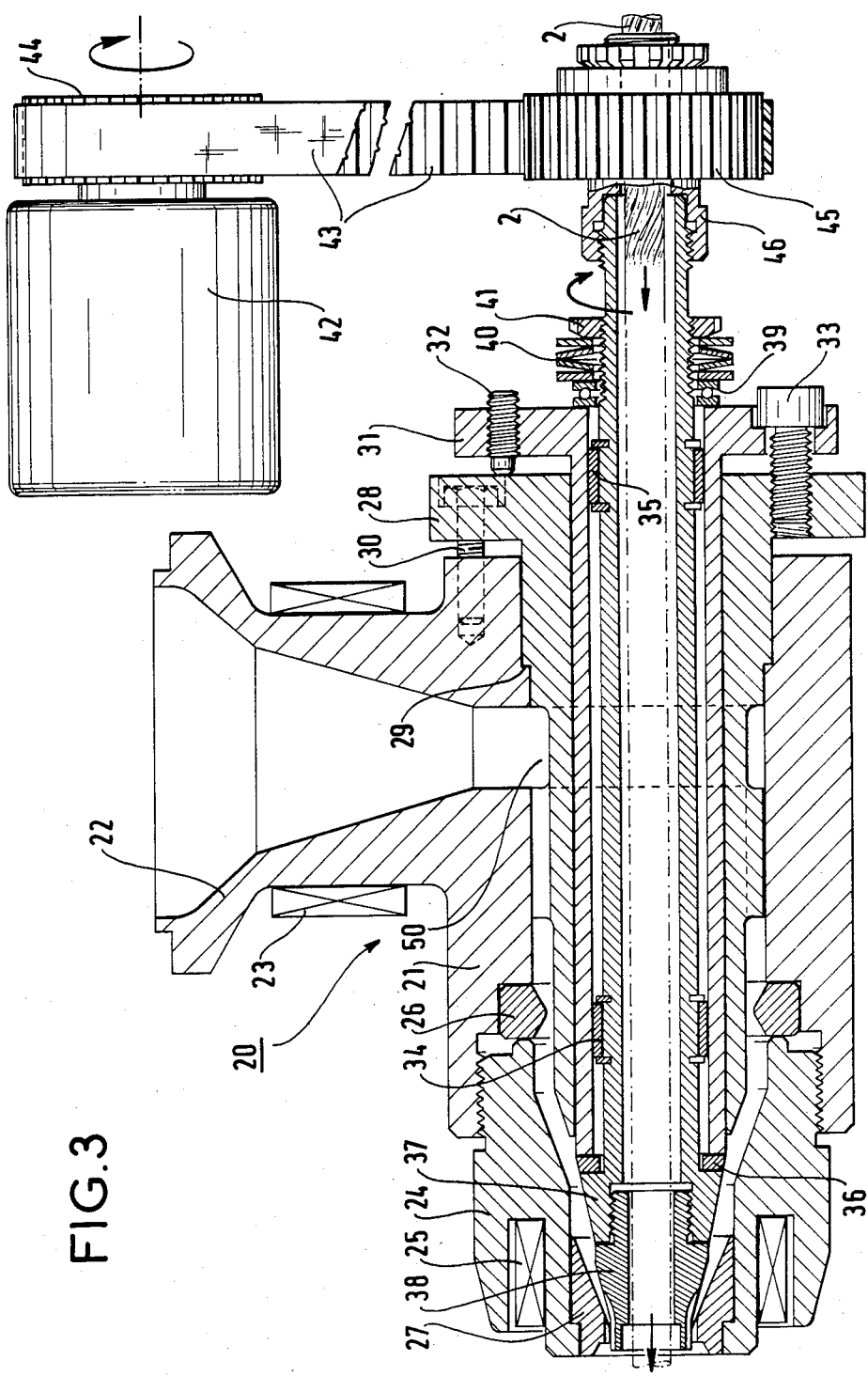
FIG. 3 shows a first device for performing a first method of cable manufacture.

In FIG. 3, there is an extrusion machine 20 comprising a central body 21 having a filling funnel 22 for thermoplastic or elastomer material. A heating resistance 23 surrounds the funnel 22 and serves to maintain the material at its melting point. The central body 21 also includes a head 24 screwed to one end thereof and provided with another heating resistance 25. As it is screwed in, the head bears against a wedge 26. The head includes a fixed die 27 which is described in greater detail below with reference to FIGS. 4 and 5.

A cylindrical part 28 is pressed against a shoulder 29 in the central body 21, and the part 28 is fixed by three screws 30 which are circumferentially distributed at 120° (only one screw is shown).

A plug 31 is inserted through the part 28. The length of the plug is adjustable by means of a plurality of circumferentially distributed screws 32 and it is locked by means of three screws 33 which are similarly distributed at 120° (only one screw being shown).

The plug 31 supports two bearings 34 and 35 and a fixed stop 36. A hollow shaft 37 having a punch 38 screwed therein rotates on the two bearings 34, 35 and presses at the punch end against the fixed stop 36 and at the other end against a ball stop 39 via resilient conical washers 40 and a nut 41. The shaft is rotated by a motor 42 via a toothed pulley 43 which couples a drive wheel 44 of the motor 42 and a drive wheel 45 connected to the shaft 37 by a tapped socket 46. This device thus comprises a material inlet circuit constituted by the funnel 22, a circular groove and channels 50 which are circumferentially distributed between the body 21 and the part 22 and run from the circular groove to the die-punch assembly.

Figure 4:
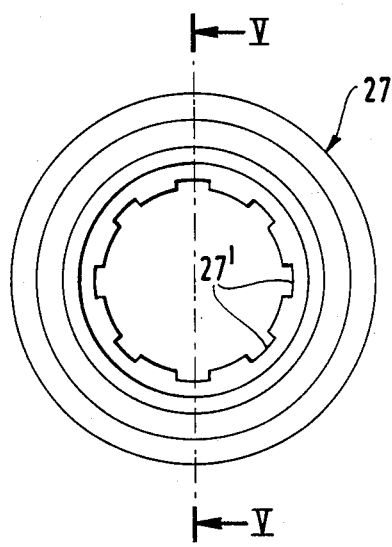
FIGS. 4 and 5, and 6 and 7 show details of the FIG. 3 device.
Figure 5:
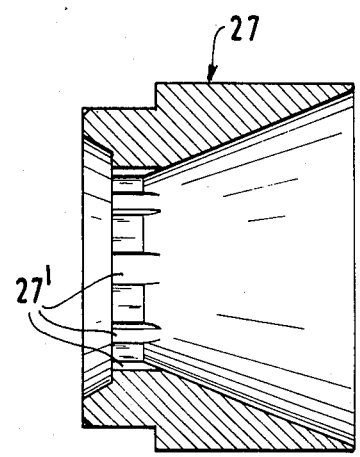

FIGS. 4 and 5 show the fixed die 27 in greater detail. The die includes grooves 27', each of which corresponds to a longitudinal strip 8 in the outer layer 7 of each envelope 3 or 13.

Figure 6:
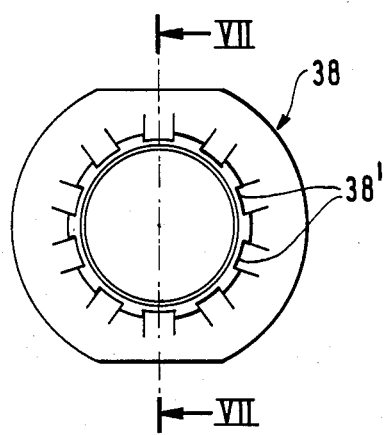
Figure 7:
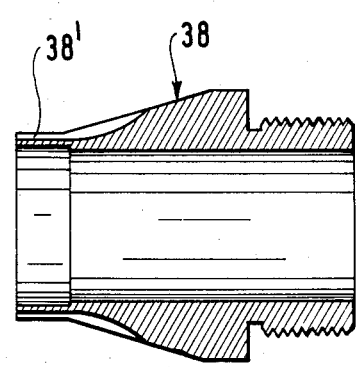

FIGS. 6 and 7 show the rotating punch 38 in greater detail. This punch includes grooves 38', each of which corresponds to a helical strip 6 in the inner layer 5 of each envelope 3 or 13.

An extrusion operation takes place as follows: a multistrand conductor 2 or 12 is inserted into the hollow shaft 37 and passes through the punch 38. The punch and the shaft are caused to rotate by the motor 42. The thermoplastic or elastomer material is inserted into the funnel 22 and it follows the channels 50 to enter the die and the punch and cover the conductor 2 or 12 thus constituting a perforated envelope 3 or 13.

The punch 38 makes the helical strips 6 of the inner layer 5 by rotating, and the die 27 makes the longitudnal strips 8 of the outer layer 7 by being fixed. The two layers 5 and 7 are naturally fixed to each other since the material is still molten as it passes through the die and the punch.

This extruding machine could include a rotating die driven by known means to constitute an outer layer made of helical strips.

Figure 8:
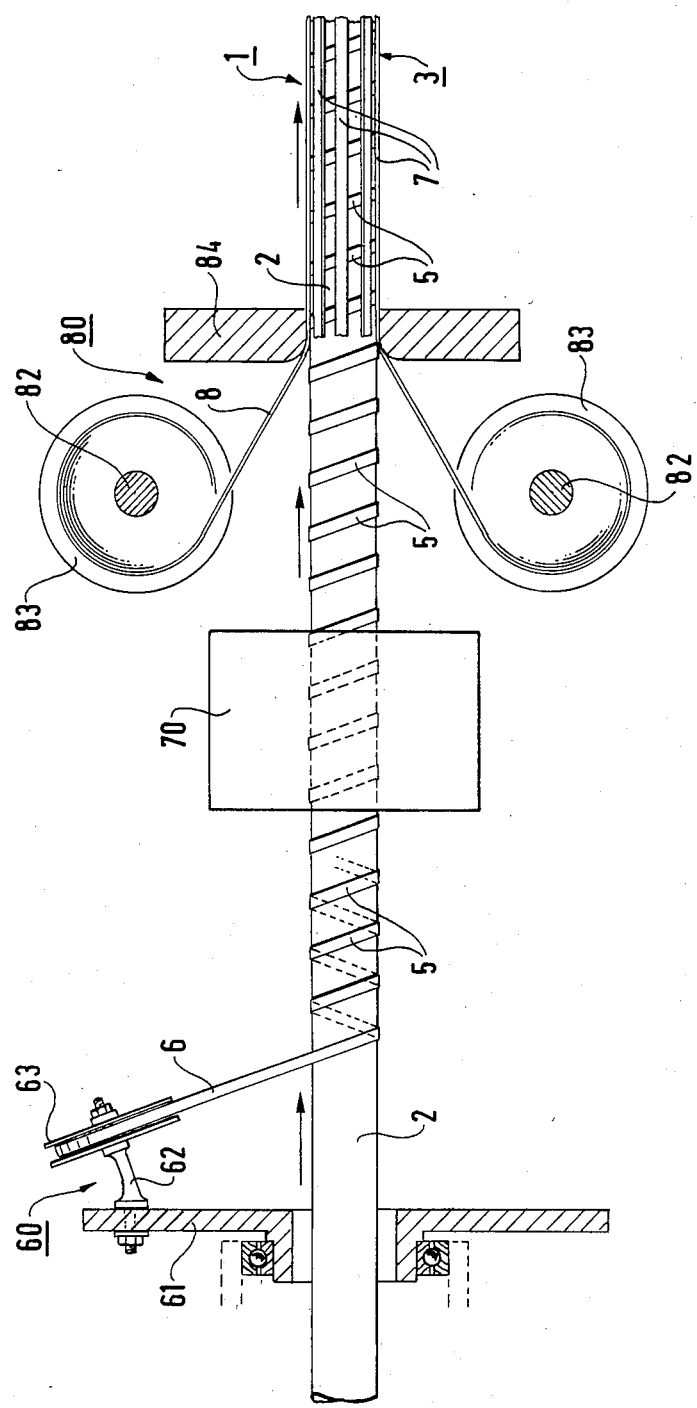
FIG. 8 shows a second device for performing a second method of cable manufacture.

FIG. 8 illustrates at alternative process of manufacture which shows a device 60 for making the first tape layer 5, a device 70 for impregnating or hot gluing, and a device 80 for manufacturing the second tape layer 7.

The device 60 is constituted by a rotating plate 61 having a spooler 62 at its periphery and inclined to enable helical winding. The spooler 62 supports a reel 63 on which a tape 6 is wound. Rotation of the plate 61 and longitudinal displacement of the conductor 2 cause the tape 6 to wind around the conductor 2 in a helical manner with non-contiguous turns to allow water to circulate. The tape 6 constitutes the first layer 5. Naturally, it is very easy to provide a plurality of spooler on the plate so as to make up the first layer 5 from a plurality of tapes 6.

The conductor 2 fitted with its layer 5 passes through the device 70 which may be a device, for example, using a hot melt or glue, or a device such as an oven for providing superficial melting.

The device 80 for fabricating the second tape layer 7 comprises eight spoolers 82 in this case, of which only two are shown, together with a die 84. Each spooler carries a reel 83 on which a tape 8 is wound. This figure shows a fixed device 80 for placing the tapes 8 longitudinally to constitute the layer 7.

Naturally, the device 80 could be mounted on a rotary plate to enable the layer 7 to be placed helically.

The two layers 5 and 7 constitute the perforated envelope 3.

The layers are put in place as follows: the conductor 2 is drawn along its axis and the first layer 5 is wound thereon by means of the rotating plate 61, the conductor 2 covered in the layer 5 is passed through the device 70 and then the second layer 7 is placed either longitudinally or helically. Cable manufacture is then terminated by placing the outer sheath.

We claim:

1. In an electric cable for transporting very high current at low voltage comprising at least one multi-strand conductor and an outer sheath, and means permitting water circulation inside the cable, the improvement comprising a perforated envelope covering said at least one multi-strand conductor for allowing water to circulate, and wherein said perforated envelope is constituted by two layers which are fixed to each other, with each layer being constituted by at least one non-contiguous strip with the non-contiguous strips of respective layers being nonaligned over their lengths to thereby allow cooling liquid to circulate longitudinally by flow along and over the at least one non-contiguous strip of one of said layers, and wherein said strips of said layers being fixed to each other decrease the risk of obstructing the cooling channels as a result of mechanical forces and electrodynamic vibration causing displacements, frictions, and possible breakage in the components of the cable.

2. An electric cable according to claim 1, wherein one layer is constituted by at least one helical strip and the other layer is constituted by at last two longitudinal strips.

3. An electric cable according to claim 1, wherein both layers are constituted by at least one helical strip, each helical strip of one layer being wound oppositely to the direction of wind of each helical strip of the other layer.

* * * * *